United States Patent
Nania

(10) Patent No.: US 9,908,392 B1
(45) Date of Patent: Mar. 6, 2018

(54) SYSTEM FOR OCCUPANTS TO INDIVIDUALLY CONTROL LIGHT AND AIR PENETRATION THROUGH A VEHICLE ROOF

(71) Applicant: FORD GLOBAL TECHNOLOGIES, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/440,368

(22) Filed: Feb. 23, 2017

(51) Int. Cl.
*B60J 7/19* (2006.01)
*B60J 7/11* (2006.01)
*E05F 15/60* (2015.01)
*E05D 15/56* (2006.01)
*E05C 9/04* (2006.01)
*E05B 83/00* (2014.01)
*B60J 7/00* (2006.01)
*B60J 7/057* (2006.01)
*B60J 7/043* (2006.01)
*B60J 7/22* (2006.01)

(52) U.S. Cl.
CPC .............. *B60J 7/11* (2013.01); *B60J 7/0015* (2013.01); *B60J 7/0435* (2013.01); *B60J 7/0573* (2013.01); *B60J 7/192* (2013.01); *B60J 7/22* (2013.01); *E05B 83/00* (2013.01); *E05C 9/042* (2013.01); *E05D 15/565* (2013.01); *E05F 15/60* (2015.01)

(58) Field of Classification Search
CPC ..................................... B60J 7/11; B60J 7/192
USPC ............................................. 296/216.01–224
See application file for complete search history.

(56) References Cited

U.S. PATENT DOCUMENTS

| 4,367,454 | A | * | 1/1983 | Modica ..................... B60J 7/194 |
| | | | | 180/286 |
| 4,940,283 | A | | 7/1990 | Androy |
| 6,485,091 | B2 | | 11/2002 | Karami et al. |
| 6,669,278 | B2 | | 12/2003 | Patelczyk et al. |
| 7,118,239 | B2 | | 10/2006 | Itch et al. |
| 7,213,854 | B2 | | 5/2007 | Dowdey et al. |
| 7,314,246 | B2 | | 1/2008 | MacNee, III et al. |
| 2005/0173946 | A1 | | 8/2005 | Grimm et al. |
| 2009/0102247 | A1 | * | 4/2009 | Grosser ............... B29C 45/1676 |
| | | | | 296/220.01 |
| 2010/0038933 | A1 | * | 2/2010 | Comfort .................. B60J 7/022 |
| | | | | 296/216.08 |

* cited by examiner

*Primary Examiner* — Dennis H Pedder
(74) *Attorney, Agent, or Firm* — Jason Rogers; King & Schickli, PLLC

(57) ABSTRACT

A vehicle includes a plurality of individually controllable vehicle roof modules. Each of these modules includes: a frame, an adjustable wind deflector carried at a fore end portion of the frame, a window panel carried on the frame, and a first motor structured to selectively open the window panel by moving the window panel away from the fore end portion and over its aft end portion when electrically energized. Each module also includes a shade and a second motor structured to selectively adjust the shade over a range from an undeployed state to a deployed state when electrically energized. The modules each carry a locking mechanism with a locked state to fix the frame in a respective roof opening and establish an electrical power circuit to energize the motors; and an unlocked state to remove the frame from the roof opening, and open the electrical power circuit.

20 Claims, 12 Drawing Sheets

SYSTEM FOR OCCUPANTS TO INDIVIDUALLY CONTROL LIGHT AND AIR PENETRATION THROUGH A VEHICLE ROOF

TECHNICAL FIELD

The present application relates to vehicle equipment to control light penetration, air penetration, or both through a vehicle roof, and more particularly, but not exclusively, relates to techniques to adjust the degree of shading, light exposure, and air ventilation through a vehicle roof by different vehicle occupants individually.

BACKGROUND

There is a persistent desire to provide a more comfortable operating environment for vehicle occupants, including both vehicle passengers and operators. Among other things, air temperature control within a vehicle has been the subject of various developments—including the application of forced-air heating, venting, and air conditioning. Related areas bearing on occupant comfort include the windowing configuration of the vehicle with respect to light admission during daytime operation and air intake through one or more vehicular window openings. The windowing arrangement also impacts the extent to which a given vehicle occupant might feel confined or even claustrophobic while in the vehicle—perhaps explaining the advent of the sunroof and the moon roof. Unfortunately, what may be comfortable for one occupant may be unpleasant for another. Thus, there is an ongoing demand for further contributions in this area of technology.

SUMMARY

Certain implementations of the present application include unique techniques to provide control over light and air penetration through a vehicle roof. Other forms of the present application include unique adaptations, additions, alternatives, apparatus, applications, arrangements, articles, aspects, circuitry, conditionals, configurations, developments, devices, discoveries, features, instrumentalities, kits, machines, manufactures, mechanisms, methods, modifications, modules, operations, options, procedures, processes, refinements, systems, upgrades, uses, vehicles, variants of any of the foregoing or the like to provide for individual vehicle occupant control of light exposure, shading, and external air intake with respect an overhead opening through the roof of a vehicle compartment.

Still a further aspect is directed to a vehicle roof module structured to occupy a roof opening that includes: a frame carrying a window panel, a window motor carried on the frame to adjust the window between an open state and a closed state, a shade carried on the frame, a shade motor carried on the frame to adjust the shade between an undeployed state and a deployed state, and a locking mechanism with a locked state to fix the frame to the opening and an unlocked state to remove the vehicle roof module from the opening.

A further form of the present application comprises: a vehicle roof defining four roof openings therethrough and four roof modules each structured to engage a corresponding one of the four roof openings. Each respective one of the four roof modules includes: a module frame, a window panel carried on the frame, a first motor carried on the frame and structured to selectively open and close the window panel when electrically energized, a shade carried on the frame, a second motor carried on the frame and structured to selectively adjust position of the shade when electrically energized, and an operator-adjustable locking mechanism. This mechanism includes a locked state to fix the frame of the respective one of the four roof modules in the corresponding one of the four roof openings and close an electric power circuit to electrically energize the first motor and the second motor, and an unlocked state to remove the respective one of the four roof modules from the corresponding one of the four roof openings and open the electric power circuit.

Yet another form of the present application comprises: a vehicle roof module that includes: a frame with a fore end portion positioned opposite an aft end portion, an adjustable wind deflector carried at the fore end portion of the frame, a window panel carried on the frame, a first motor carried on the frame and structured to selectively open the window panel over a range of different opening sizes by moving the window panel away from the fore end portion of the frame and over the aft end portion of the frame when electrically energized. The window panel and motor further cooperate to selectively define a spoiler vent between the window panel and the aft end portion of the frame. Also, the frame carries a shade and a second motor structured to selectively adjust the shade over a range of different positions from an undeployed state to a deployed state when electrically energized. Furthermore, a locking mechanism is included that comprises a first projection and a second projection opposite the first projection. The first projection and the second projection are each electrically conductive. Additionally, the locking mechanism includes a locked state to extend the first projection and the second projection, fix the frame in the opening, and close an electric power circuit through the first projection and the second projection to electrically energize the two motors; and an unlocked state to retract the first projection and the second projection, to remove the frame, and open the electric power circuit established by the locked state.

Still another form of the present application is directed to a vehicle, comprising: a vehicle occupant compartment including four occupant seats with two of the four occupant seats being positioned aft of two other of the four occupant seats. This vehicle includes a roof defining four vehicle roof openings each positioned over a different one of the four occupant seats. Also, there are four roof modules each structured to engage a corresponding one of four vehicle roof openings. Each respective one of the four roof modules includes: a frame, a window panel, a first motor carried on the frame and structured to open and close the window panel to adjust air flow through the respective one of the four modules when electrically energized, a shade, and a second motor carried on the frame and structured to adjust position of the shade to adjust light penetration through the respective one of the four modules when electrically energized. Additionally, the vehicle includes four locking mechanisms each corresponding to a separate one of the four roof modules. Each individual one of the four locking mechanisms includes a locked state to fix the frame of the separate one of the four roof modules in the corresponding one of the four roof openings and close or establish an electric power circuit to electrically energize to the first motor and the second motor of the separate one of the four roof modules, and an unlocked state to remove the separate one of the four roof modules from the corresponding one of the four roof openings and open the electric power circuit of the individual one of the four locking mechanisms.

In accordance with still another aspect, a method is provided for operating a vehicle roof module including a frame, a displaceable window panel and a displaceable shade. That method includes the steps of: (a) seating the vehicle roof panel in a roof opening of a vehicle roof, (b) shifting an actuator, such as a lever, to a locked state to secure the vehicle roof panel in the roof opening and close an electric power circuit and (c) driving motors to displace the displaceable window panel and displaceable shade through the now closed electric power circuit.

The method may further include the steps of opening and closing both the displaceable shade and the displaceable window panel. Further, the method may include the step of shifting the actuator to an unlocked state to remove the vehicle roof module from the roof opening and open the electric power circuit.

The above introduction to the present application is not to be considered exhaustive or exclusive in nature—merely serving as a forward to further advances, advantages, approaches, attributes, benefits, characteristics, contributions, efficiencies, features, gains, goals, improvements, incentives, influences, objectives, operations, principles, progressions, purposes, savings, uses, variants of any of the foregoing, or the like. Other adaptations, additions, alternatives, apparatus, applications, arrangements, articles, aspects, circuitry, configurations, developments, devices, discoveries, forms, implementations, instrumentalities, kits, machines, manufactures, mechanisms, methods, modifications, modules, operations, options, procedures, processes, refinements, systems, upgrades, uses, vehicles, variants of any of the foregoing, or the like shall become apparent from the description provided herewith, any attendant drawing figures, any patent claim appended hereto, or any other information provided herewith.

BRIEF DESCRIPTION OF THE DRAWING FIGURES

Throughout the present application, occurrence of a reference numeral in one drawing figure like that in a previously introduced drawing figure refers to the like feature already described for the previous occurrence thereof. The accompanying drawing figures incorporated herein and forming a part of the specification, illustrate several aspects of the present application, and together with the description explain certain principles thereof.

DETAILED DESCRIPTION

In the following description, various details are set forth to provide a thorough understanding of the principles and subject matter of the content described or illustrated herein, or set forth in any patent claim appended hereto. To promote this understanding, the description refers to certain representative aspects—using specific language to explicate the same accompanied by any drawing figures to the extent the description subject matter admits to illustration. In other instances, when the description subject matter is well-known, such subject matter may not be described in detail and/or may not be illustrated to avoid obscuring information that is to be conveyed in detail. Considering further any patent claim that follows, those skilled in the relevant art will recognize that the same can be practiced without one or more specific details included in the description. Further, the full scope of any patent claims can encompass, cover, read on, or otherwise extend or apply to any instance in which one or more various unexpressed aspects exist in addition to that subject matter made explicit therein. Such unexpressed aspects can be directed to anything that is additional to that explicitly recited with respect to any patent claim that follows. Accordingly, this description sets forth representative examples only and does not limit the scope of any patent claims provided herewith.

Figure 1:
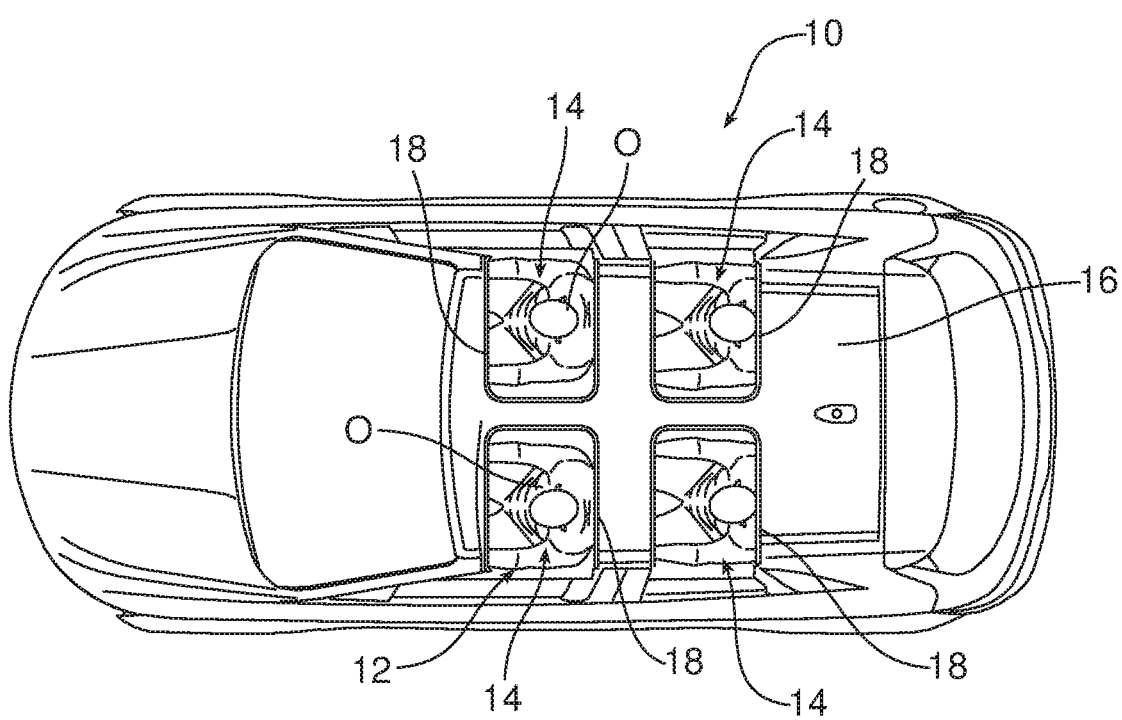
FIG. 1 depicts a partially diagrammatic top view of a vehicle of one form of the present application illustrating four separate roof openings, the roof modules for each roof opening having been removed.

Reference is now made to FIG. 1 illustrating a motor vehicle 10 having a vehicle compartment 12 with four occupants O in the four occupant seats 14 and a roof 16 defining four roof openings 18. Each roof opening 18 is positioned over one of the occupants O in the occupant seats 14.

Figure 2:
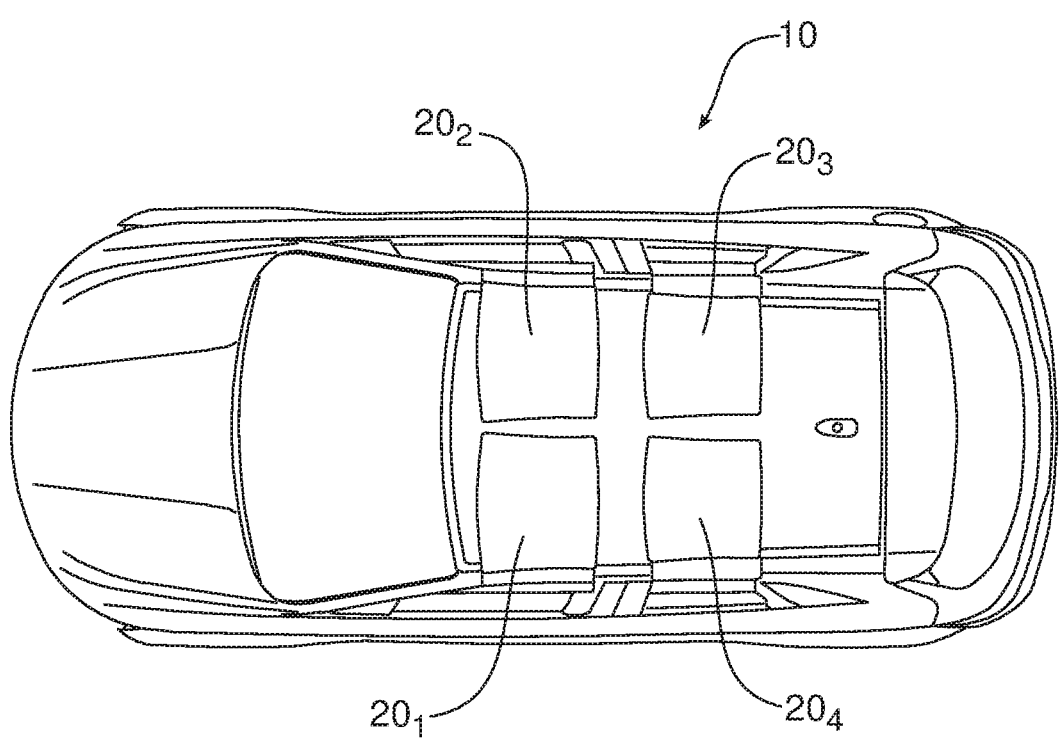
FIG. 2 is a view similar to FIG. 1 but depicting all four roof modules in closed positions in the roof openings.
Figure 3:
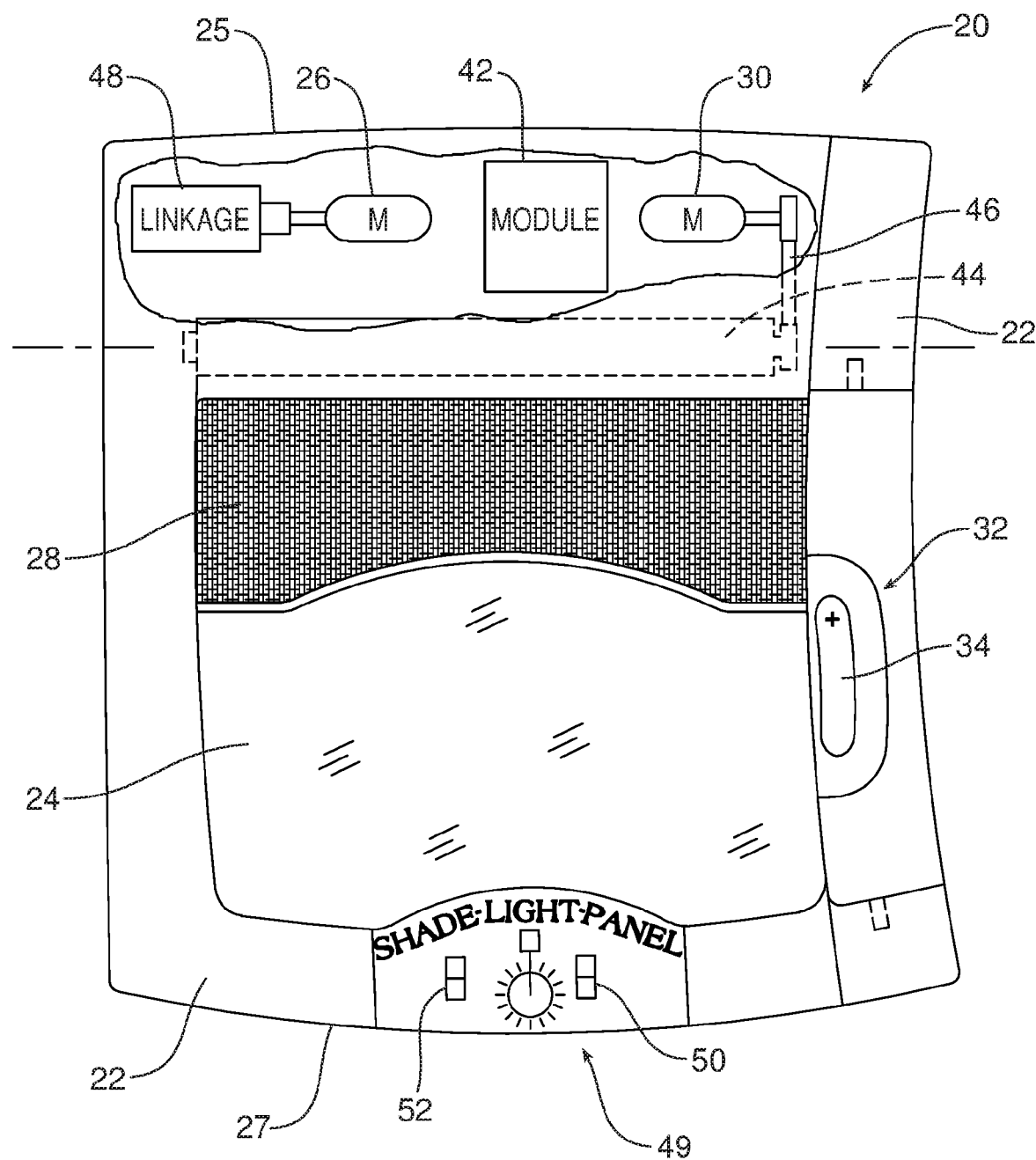
FIG. 3 is a schematic illustration of one roof module and its operating components.

As illustrated in FIG. 2, each roof opening 18 is closed by a roof module 20. Thus, a first of the four roof openings 18 is closed by a first roof module 201 of the four roof modules 201, a second of the four roof openings is closed by a second roof module 202 of the four roof modules, a third of the four roof openings is closed by a third roof module 203 of the four roof modules and a fourth of the four roof openings is closed by a fourth roof module 204 of the four roof modules (compare FIGS. 1 and 2). As illustrated in FIG. 3, each roof module 201-204 (collectively referred to by reference numeral 20 in FIG. 3) includes a frame 22, a displaceable window panel 24 carried on the frame, a first motor 26 (carried on the frame) to selectively open and close the window panel, a displaceable shade 28 carried on the frame 22, a second motor 30 (carried on the frame) to selectively open and closed the shade and an operator-adjustable locking mechanism or actuator 32. The shade 28 is positioned beneath the window panel 24. Both the window panel 24 and the shade 28 open toward the aft end portion 25 of the frame 22 and close toward the fore end portion 27 of the frame.

In the illustrated embodiment the operator-adjustable locking mechanism or actuator 32 comprises an operator control such as the lever 34. The operator-adjustable locking mechanism or actuator 32/lever 34 is displaceable between: (a) a locked state, illustrated in FIGS. 4 and 5, to fix the roof module 20 by its frame 22 in the respective roof opening 18 and also establish a closed electric power circuit 36 to electrically energize the first motor 26 and the second motor 30 and (b) an unlocked state, illustrated in FIGS. 6 and 7 to remove the roof module from the roof opening and open the electric power circuit. The electric power circuit 36 is part of the overall module control subsystem 38 including a vehicle electric power supply 40 and the module control circuitry 42 for controlling the operation of the first motor 26 and the second motor 30.

More specifically, the module control circuitry 42 includes one or more controllers, each controller in the form of a computing device such as a dedicated microprocessor or an electronic control unit (ECU) operating in accordance with instructions from appropriate control software. Thus, the module control circuitry 42 includes one or more processors, one of more memories and one or more network interfaces all in communication with each other over a communication bus. In the illustrated embodiment, the module control circuitry 42 is carried on the roof module 20.

Figure 10:
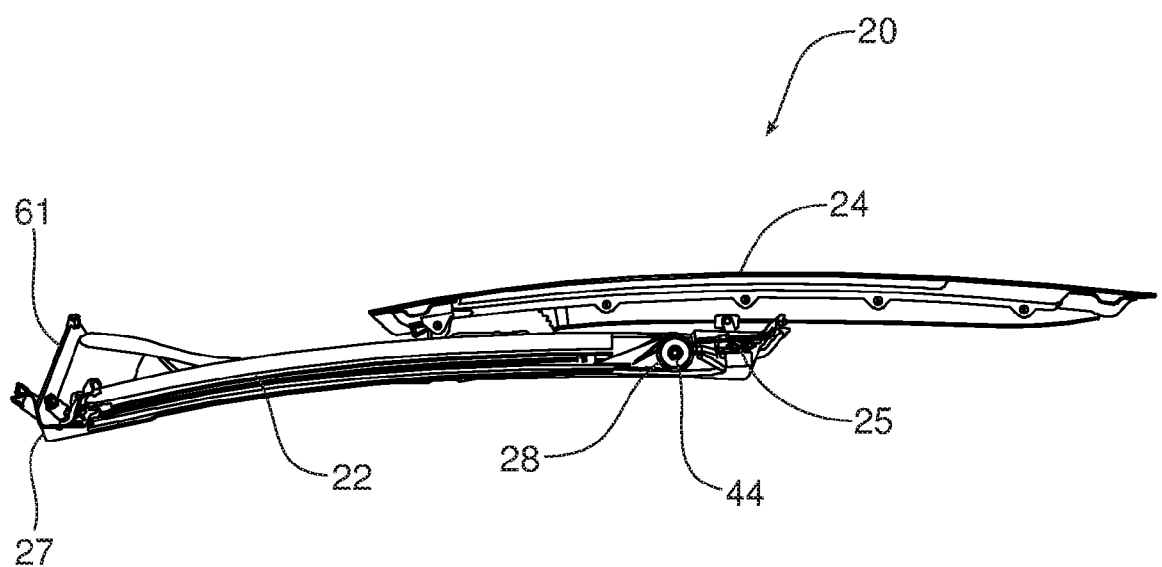
FIG. 10 is a cross-sectional view of a single roof module along line 10-10 of FIG. 9.

As illustrated in FIG. 3, the shade 28 is wound onto the roller 44 when opened and unwound from the roller when closed. The motor 30 drives the roller 44 through the linkage 46 in a manner known in the art of retractable shades for motor vehicles. Similarly, the window panel 24 is displaced between a closed position illustrated in full line in FIG. 8, a vent position illustrated in phantom line in FIG. 8 and an opened position illustrated in FIG. 10 by means of the first motor 26 through a drive linkage 48 of a type known in the art. The operator controls the opening and closing of the window panel 24 and the shade 28 by means of the occupant control 49 including the switch 50 and the switch 52. The switch 50, carried on the frame 22 of the module 20, allows one to selectively open and close the shade 28. The switch 52, also carried on the frame 22, allows one to selectively vent, open or close the window panel 24.

Figure 8:
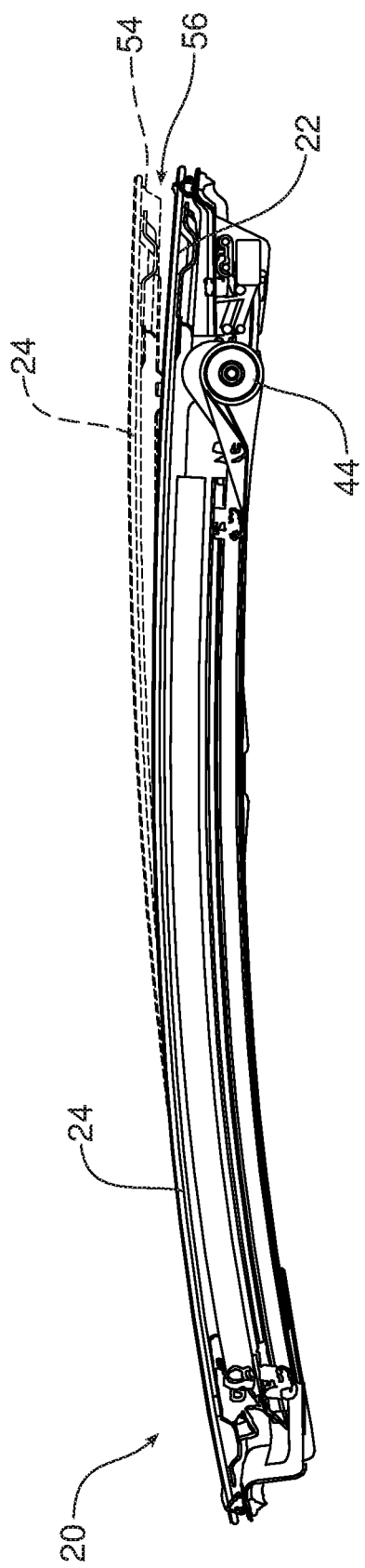
FIG. 8 is a cross-sectional view of a roof module illustrated in a vent position.

More specifically, when one initially opens or first displaces the window panel 24 from the closed position, the aft end 54 of the window panel is lifted, forming a vent spoiler 56 over the aft end portion of the frame 22 (see FIG. 8). A second press of the switch 52 continues to move the window panel 24 toward the fully open position shown in FIG. 10. When the window panel 24 is opened, a wind deflector 61, of a type known in the art, at the fore end portion 27 of the frame 22, pops up into a deployed state and functions to reduce wind turbulence by deflecting the airstream away from the open roof module 20. When the window panel 24 is closed, the wind deflector 61 lowers in a manner known in the art into an undeployed state out of the way so that the window panel may close freely.

Figure 5:
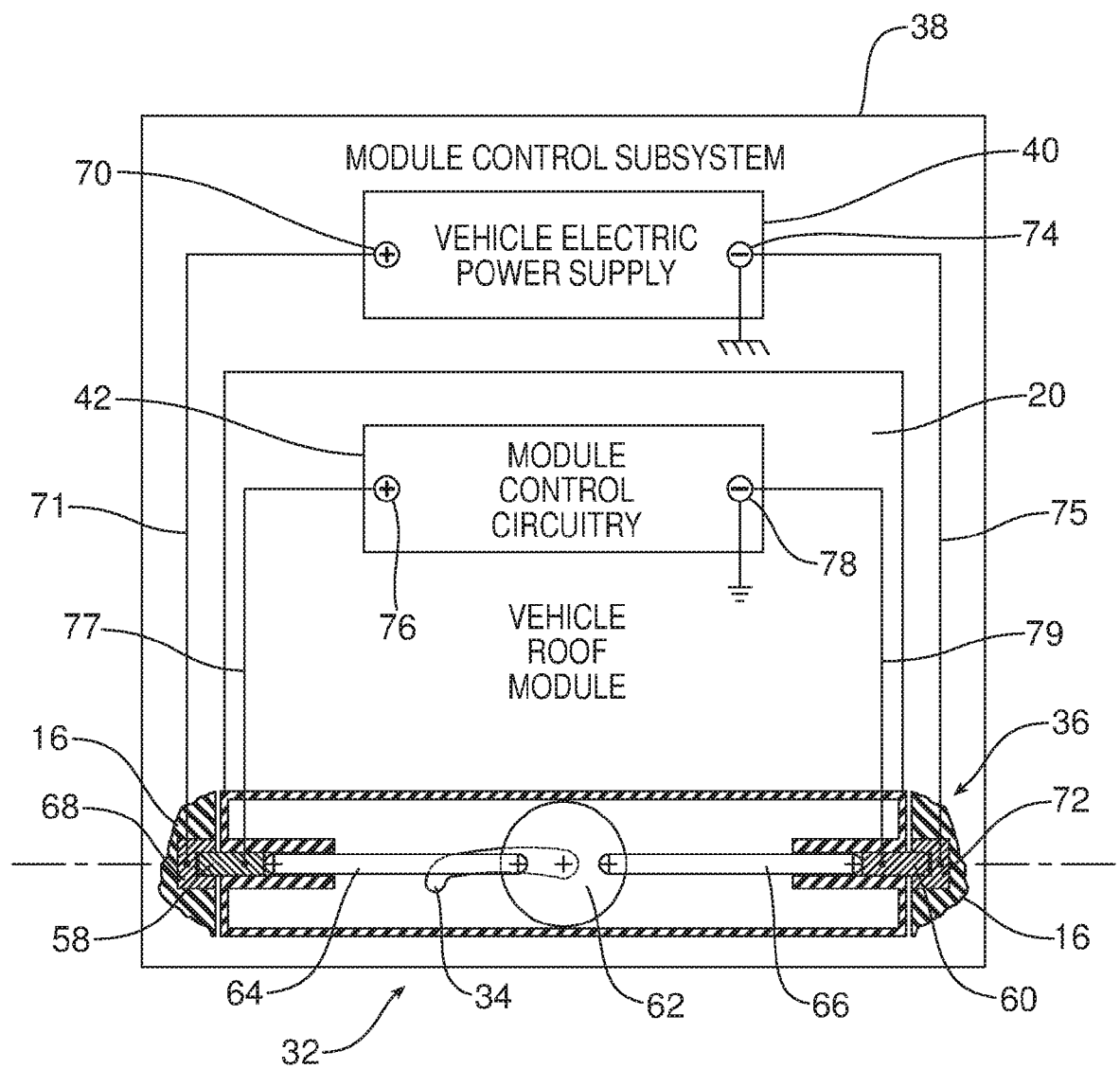
FIG. 5 is a schematic illustration of the lever in the locked state wherein pins controlled by the lever are extended to lock the roof module in place in the roof opening and close the electric circuit used to drive the motors that open and close the window panel and shade of the roof module.
Figure 6:
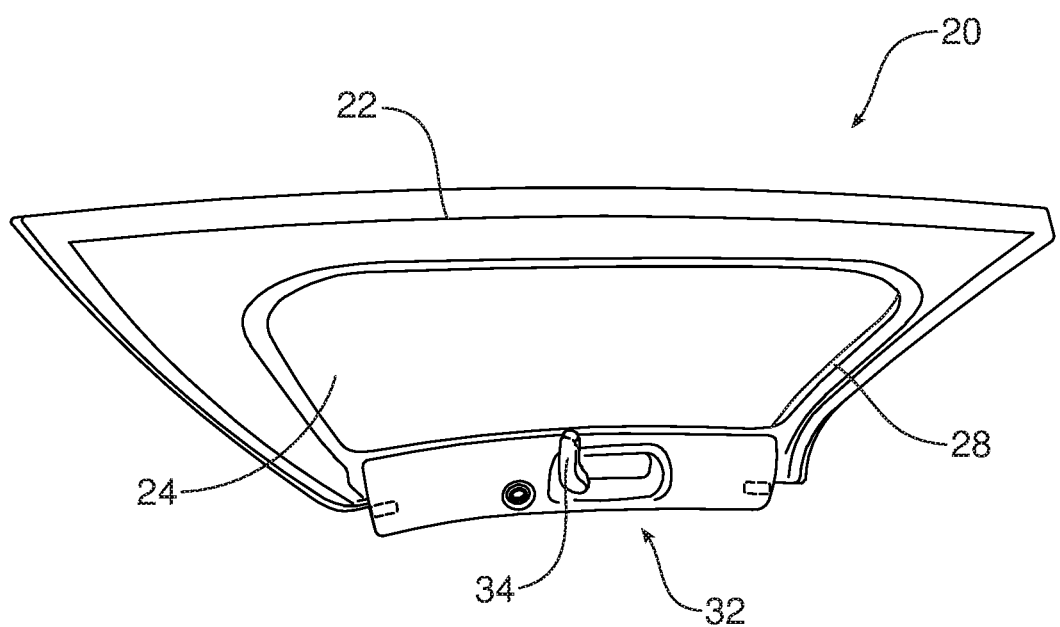
FIG. 6 is a perspective view of a roof module similar to FIG. 4 but showing the actuator or lever in the unlocked state.

Reference is now made to FIG. 5, illustrating the operator-adjustable locking mechanism or actuator 32 in the locked state and FIG. 6 illustrating the operator-adjustable locking mechanism or actuator in the unlocked state. As illustrated, the lever 34 is connected to a first projection or pin 58 and a second projection or pin 60 by means of a rotary latch element 62, a first link 64 and a second link 66. The lever 34 is connected to and turns the rotary latch element 62. The proximal end of the first link 64 is attached to the rotary latch element 62 and the distal end of the first link is attached to the first pin 58. Similarly, the proximal end of the second link 66 is attached to the rotary latch element 62 and the distal end is attached to the second pin 60. The two pins 58, 60 are made from an electrically conductive material.

Figure 4:
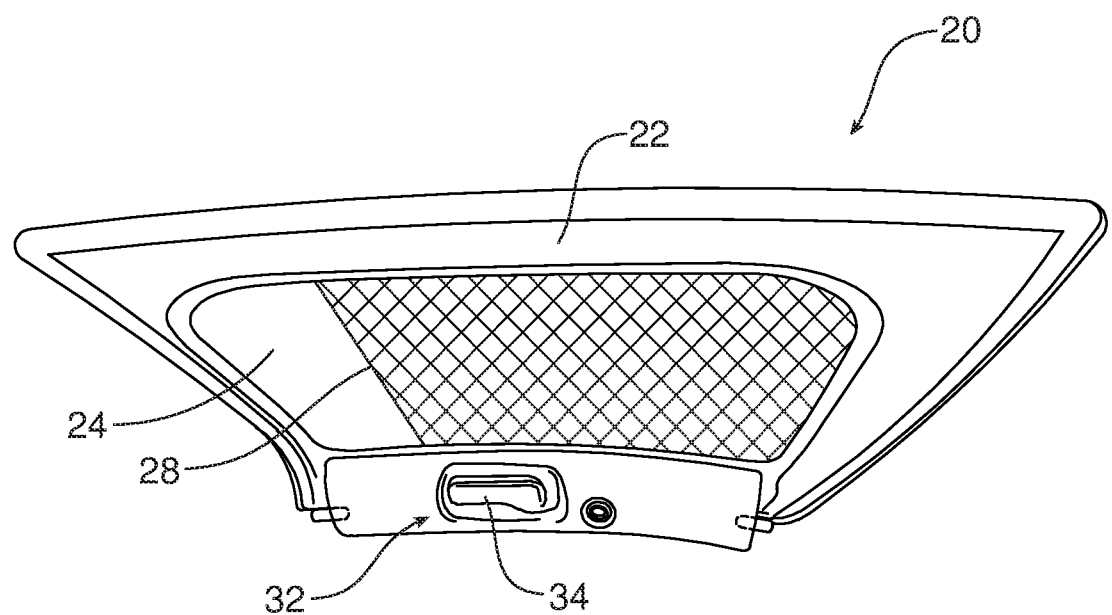
FIG. 4 is a perspective view of a roof module showing the actuator or lever in the locked state.

When the operator-adjustable locking mechanism or actuator 32/lever 34 is in the locked state illustrated in FIGS. 4 and 5, the two opposed pins 58, 60 are displaced outward. Thus, the first pin 58 engages with and makes electrical connection with the first electrical contact 68 (fixed in the roof 16) which is connected to the positive terminal 70 of the vehicle electric power supply 40 by the lead 71. Similarly, the second pin 60 engages with and makes electrical connection with the second electrical contact 72 (fixed in the roof 16) which is connected to the negative terminal 74 of the vehicle electric power supply 40 by the lead 75. The first pin 58 is connected to the positive terminal 76 of the module control circuitry 42 by the lead 77 and the second pin is connected to the negative terminal 78 of the module control circuitry 42 by the lead 79. Thus, it should be appreciated that when the operator adjustable locking mechanism or actuator 32/lever 34 is in the locked state, the pins 58, 60 engage the fixed contacts 68, 72 thereby securing the roof module in position in the associated roof opening 18 but also close the electric power circuit 36 and thereby energizing the module control circuitry 42. This allows one to independently open and close the shade 28 and window panel 24 as desired, using the control switches 50, 52.

Figure 7:
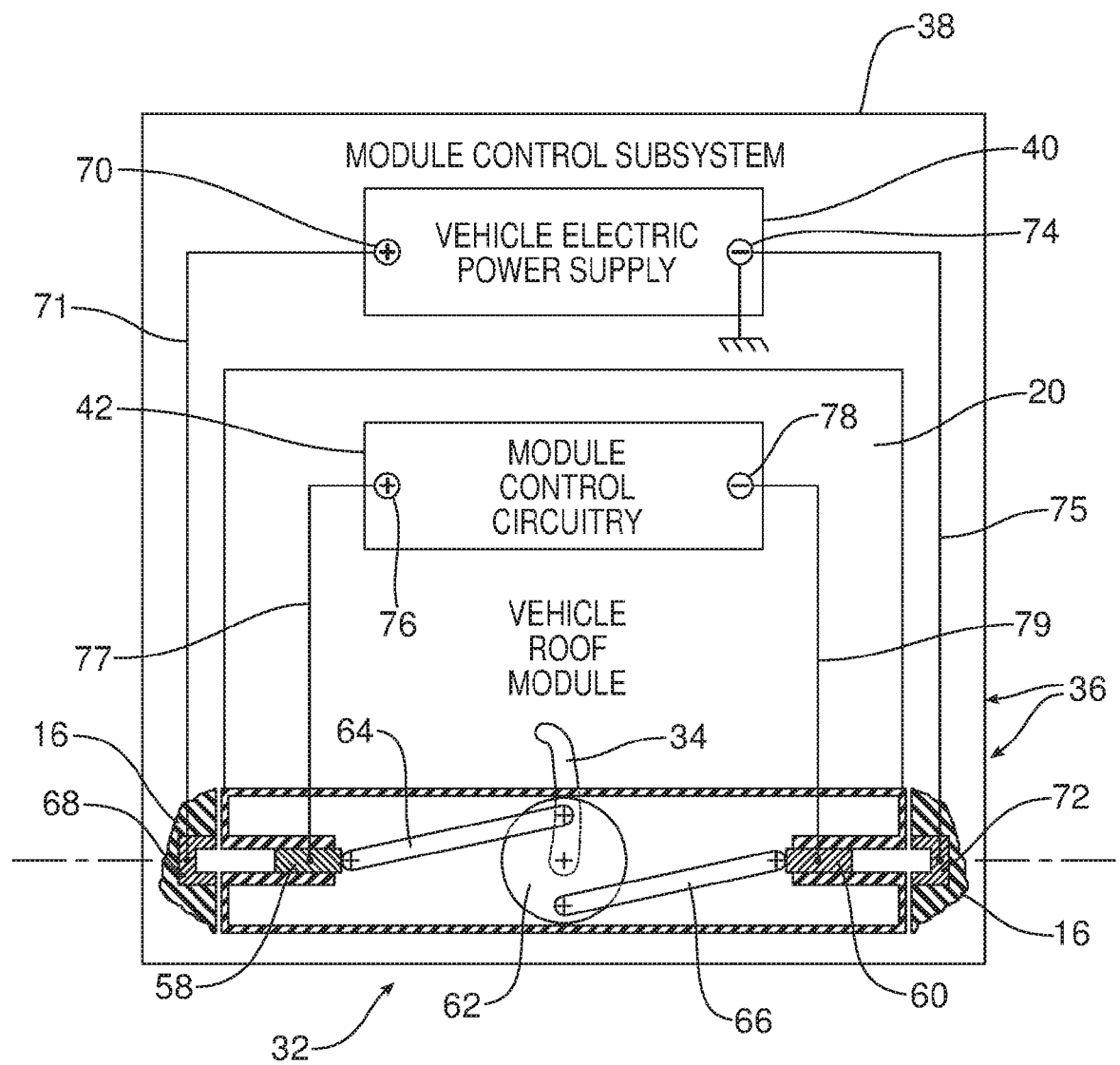
FIG. 7 is a schematic view similar to FIG. 5 but illustrating the lever in the unlocked state wherein the pins controlled by the lever are retracted to unlock the roof module in preparation for removal from the roof opening and the electric circuit is opened.

In contrast, when one manipulates the operator-adjustable locking mechanism or actuator 32/lever 34 by rotating through 90 degrees into the unlocked state illustrated in FIGS. 6 and 7, the two opposed pins 58, 60 are withdrawn inward, disengaging from the respective contacts 68, 72. As a result, the electric power circuit 36 is opened and the module control circuitry 42 is deenergized. In addition, the roof module 20 is disconnected from the roof 16 allowing the removal of the roof module from the roof opening 18.

Consistent with the above description, a method is provided for operating a vehicle roof module 20 including a frame 22, a displaceable window panel 24 and a displaceable shade 28. That method includes the step of seating the vehicle roof module 20 in a roof opening 18 of a vehicle roof 16. In addition, the method includes the step of shifting an actuator 32 to a locked state to secure the vehicle roof module 20 in the roof opening 18 and to close the electric power circuit 36. Further, that method includes driving motors 26, 30 to displace the displaceable window panel 24 and displaceable shade 28 with electric power delivered through the electric power circuit 36.

Still further, the method may include the steps of opening the displaceable shade 28 and opening the displaceable window panel 24. The method may also include the steps of closing the displaceable window panel 24 and closing the displaceable shade 28. Advantageously, the occupant control 49 functions with the first drive motor 26 and the second drive motor 30 to allow for independent operation of the window panel 24 and the shade 28.

The method also includes the step of shifting the actuator 32 to an unlocked state to remove the vehicle roof module 20 from the roof opening 18 and open the electric power circuit 36. In some embodiments, the actuator 32 may only be shifter to the unlocked state when both the window panel 24 and the shade 28 are in the closed or deployed positions.

In any of the embodiments, the first motor 26 is structured to selectively open the window panel 24 into a spoiler vent position (as illustrated in phantom line in FIG. 8) and over a range of different opening sizes by moving the respective window panel away from the fore end portion 27 of the frame 22 and over the aft end portion 25 of the frame when electrically energized. The second motor 30 is structured to selectively adjust the shade 28 over a range of different positions from an undeployed state to a fully deployed state when electrically energized.

As should be appreciated from the foregoing description, each occupant O may control the air and light penetration through the roof opening above each occupant. In FIG. 1, all four roof modules 20 have been removed and air and light may penetrate through the roof openings 18 unabated. As illustrated in FIG. 2, all four roof modules 201, 202, 203, 204 are in place in the roof openings 18 above each occupant (hidden from view) and the window panels 24 and the shades 28 are all closed, effectively minimizing any penetration of air and light through the openings. It should be appreciated that FIGS. 1 and 2 represent the extremes.

Figure 9:
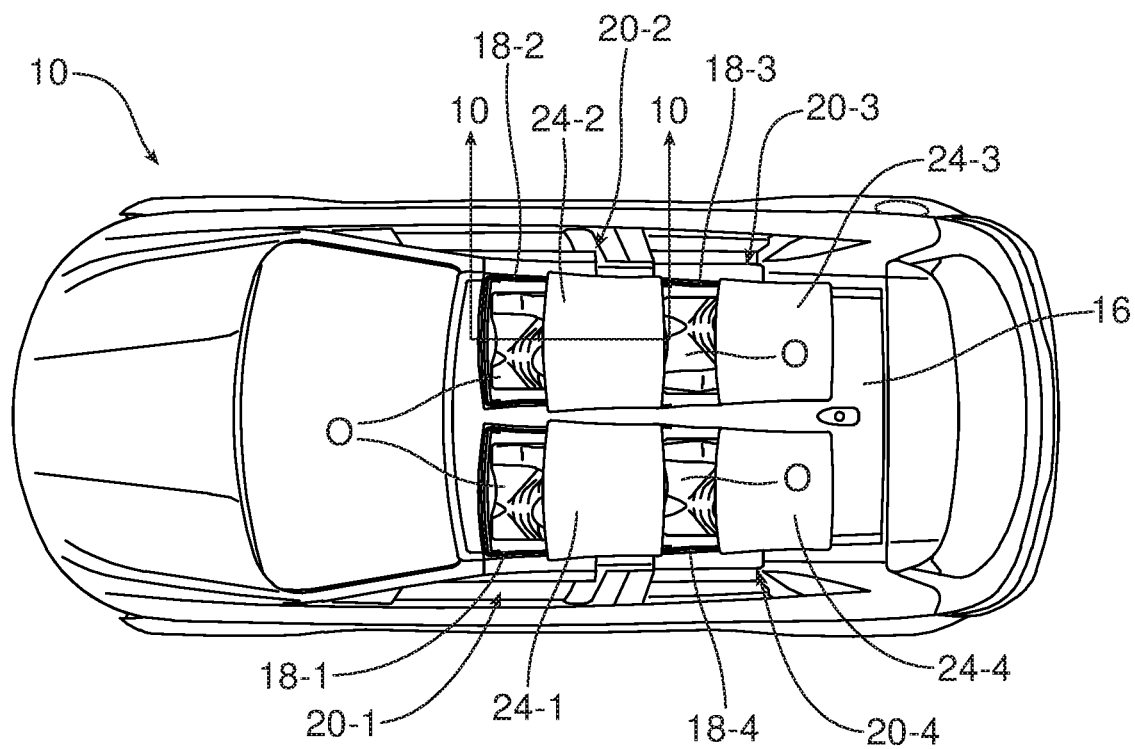
FIG. 9 is a top plan view of a motor vehicle illustrating all four roof modules in fully opened positions.
Figure 11:
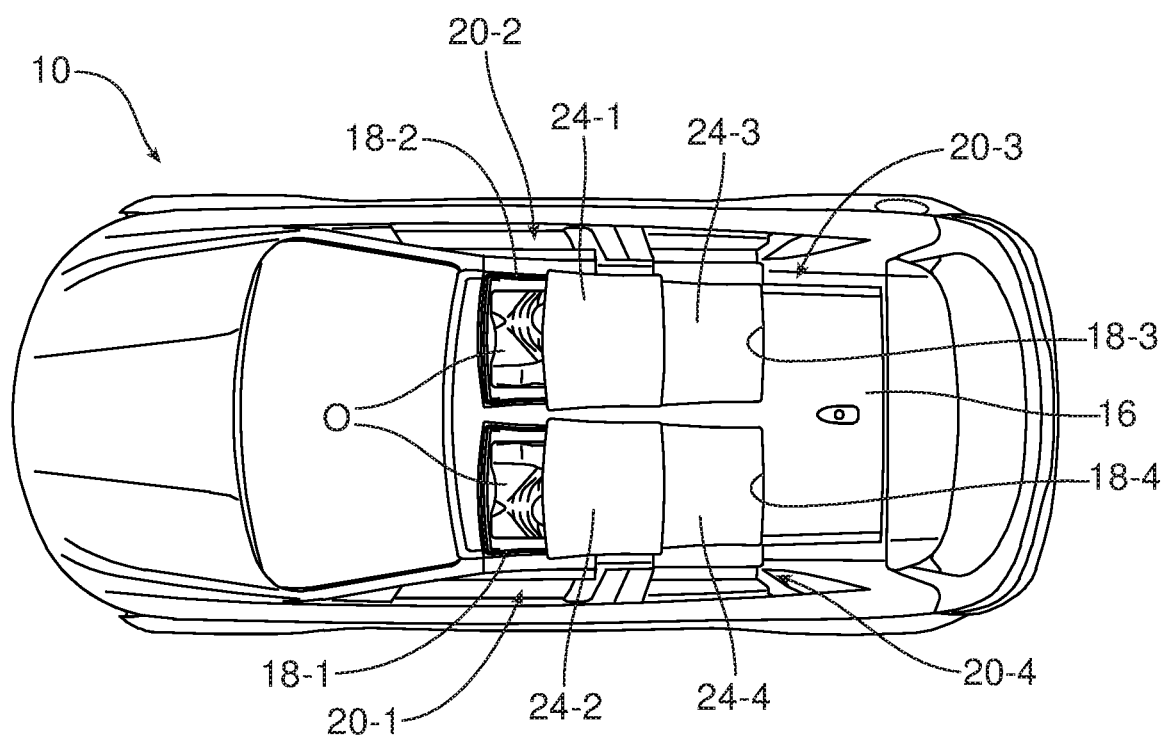
FIG. 11 is a top plan view of a motor vehicle illustrating the front two roof modules open and the rear two roof modules closed.
Figure 12:
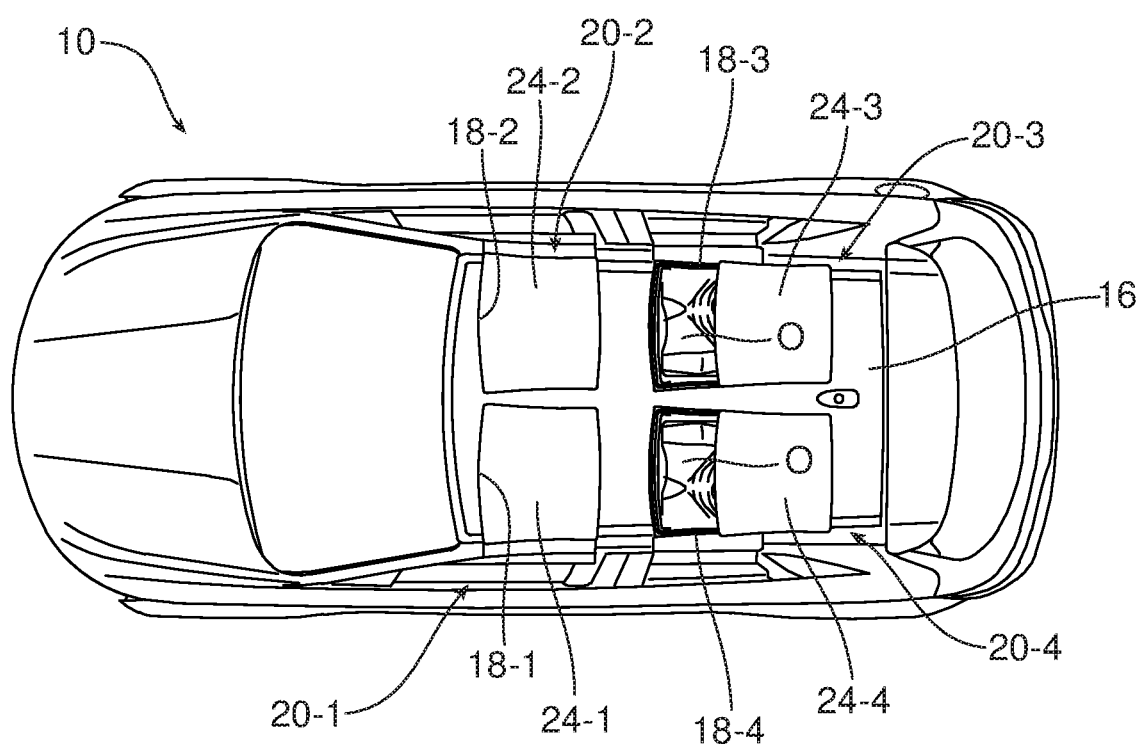
FIG. 12 is a top plan view similar to FIG. 11 but illustrating the rear two roof modules open and the front two roof modules closed.

In FIG. 9, the first roof module 20-1 in the first opening 18-1, the second roof module 20-2 in the second roof opening 18-2, the third roof module 20-3 in the third roof opening 18-3 and the fourth roof module 20-4 in the fourth roof opening 18-4 are all in place with the shades (not shown) and the window panels 24-1, 24-2, 24-3, 24-4 all open. In FIG. 11, the window panels 24-1 and 24-2 of the roof modules 20-1 and 20-2 remain open while the window panels 24-3 and 24-4 of the third and fourth roof modules 20-3 and 20-4 have been closed. In FIG. 12, the window panels 24-1 and 24-2 of the first and second roof modules 20-1 and 20-2 are closed while the window panels 24-3 and 24-4 of the third and fourth roof modules 20-3 and 20-4 are now open.

Here it should be appreciated that FIGS. 1, 2, 9, 11 and 12 are just five examples of a multitude of potential configurations of the roof modules 20-1, 20-2, 20-3 and 20-4. Each occupant O individually controls the roof module 20-1, 20-2, 20-3 and 20-4 in the roof opening 18-1, 18-2, 18-3 and 18-4 above each occupant. Each occupant O can individually position the window panel 24-1, 24-2, 24-3 and 24-4 and the shade (hidden from view in these figures) above each occupant in any desired position from undeployed or open to fully deployed or closed. Alternatively, as illustrated in FIG. 1, any one, any two, any three or all of the occupants O may even remove the roof module 20-1, 20-2, 20-3 and 20-4 from the roof opening 18-1, 18-2, 18-3 and 18-4 if so desired.

The foregoing has been presented for purposes of representative illustration and description. It is not intended to be exhaustive or to limit any patent claim appended hereto. Obvious modifications and variations may result from the above teachings. All such modifications and variations are within the scope of the appended patent claims when interpreted in accordance with the breadth to which they are fairly, legally, and equitably entitled.

What is claimed:

1. An apparatus, comprising:
    a vehicle roof defining four roof openings therethrough;
    four roof modules each structured to engage a corresponding one of the four roof openings and each respective one of the four roof modules including:
        a frame;
        a window panel carried on the frame;
        a first motor structured to selectively open and close the window panel when electrically energized, the first motor being carried on the frame;
        a shade carried on the frame;
        a second motor structured to selectively adjust position of the shade when electrically energized, the second motor being carried on the frame; and
        an operator-adjustable locking mechanism including:
            a locked state to fix the frame of the respective one of the four roof modules in the corresponding one of the four roof openings and form an electric power circuit to electrically energize the first motor and the second motor; and
            an unlocked state to remove the respective one of the four roof modules from the corresponding one of the four roof openings and open the electric power circuit.

2. The apparatus of claim 1, in which:
    the shade for each of the four roof modules is positioned beneath the window panel of the respective one of the four roof modules;
    the frame of each of the four roof modules includes a respective fore end portion opposite a respective aft end portion; and
    the window panel of each of the four roof modules moves away from the respective fore end portion and over the respective aft end portion when opened with the first motor.

3. The apparatus of claim 2, in which the window panel is structured to define a spoiler vent over the respective aft end portion of the frame in response to being initially opened with the first motor.

4. The apparatus of claim 1, wherein said operator-adjustable locking mechanism of each corresponding one of the four roof modules, includes:
    a first pin;
    a second pin opposite the first pin, the first pin and the second pin being electrically conductive, the first pin and the second pin extending from the frame of the corresponding one of the four roof modules to engage the vehicle roof in the locked state thereof and retract into the frame of the corresponding one of the four roof modules to disengage from the vehicle roof in the unlocked state thereof; and
    an operator control to select between the locked state and the unlocked state.

5. The apparatus of claim 1, further comprising:
    a first module occupant control operatively coupled to the first motor and the second motor of a first one of the four roof modules to adjust the window panel and shade of the first one of the four roof modules, the first module occupant control being carried on the frame of the first one of the four roof modules;
    a second module occupant control operatively coupled to the first motor and the second motor of a second one of the four roof modules to adjust the window panel and shade of the second one of the four roof modules, the second module occupant control being carried on the frame of the second one of the four roof modules;
    a third module occupant control operatively coupled to the first motor and the second motor of a third one of the four roof modules to adjust the window panel and shade of the third one of the four roof modules, the third module occupant control being carried on the frame of the third one of the four roof modules; and
    a fourth module occupant control operatively coupled to the first motor and the second motor of a fourth one of the four roof modules to adjust the window panel and shade of the fourth one of the four roof modules, the fourth module occupant control being carried on the frame of the fourth one of the four roof modules.

6. The apparatus of claim 1, in which the operator-adjustable locking mechanism includes a lever for providing the locked state and the unlocked state.

7. The apparatus of claim 1, further comprising four wind deflectors each positioned along a fore end portion of the respective one of the four roof modules, in which each separate one of the four wind deflectors includes a respective undeployed state and a deployed state.

8. An apparatus, comprising: a vehicle roof module, including:
a frame with a fore end portion positioned opposite an aft end portion;
a window panel carried on the frame;
a first motor structured to selectively open the window panel over a range of different opening sizes by moving the window panel away from the fore end portion of the frame and over the aft end portion of the frame when electrically energized, and further to selectively define a spoiler vent between the window panel and the aft end portion of the frame, the first motor being carried on the frame;
a wind deflector carried at the fore end portion of the frame, the wind deflector including a first deployed state when the window panel is fully opened;
a shade carried on the frame;
a second motor structured to selectively adjust the shade over a range of different positions from an undeployed state to a second deployed state when electrically energized, the second motor being carried on the frame;
a locking mechanism including:
a first projection;
a second projection, the first projection and the second projection each being electrically conductive;
a locked state to extend the first projection and the second projection, fix the frame, and establish an electric power circuit through the first projection and the second projection to electrically energize the first motor and the second motor; and
an unlocked state to retract the first projection and the second projection, to move the frame, and open the electric power circuit established by the locked state.

9. The apparatus of claim 8, further comprising:
a vehicle including a vehicle compartment with four occupant seats and a roof defining four openings therethrough, a corresponding one of each of the four openings being positioned over a respective one of the four occupant seats;
three other vehicle roof modules, each including:
a respective frame with a respective fore end portion positioned opposite a respective aft end portion, the respective frame being structured to rest in the corresponding one of the four openings;
a respective adjustable wind deflector carried at the respective fore end portion of the respective frame;
a respective window panel carried on the respective frame;
a respective first motor structured to selectively open the respective window panel over a range of different opening sizes by moving the respective window panel away from the respective fore end portion of the respective frame and over the respective aft end portion of the respective frame when electrically energized, and further to selectively define a respective spoiler vent between the respective window panel and the respective aft end portion of the respective frame, the respective first motor being carried on the respective frame;
a respective shade carried on the respective frame;
a respective second motor structured to selectively adjust the respective shade over a range of different positions from a respective undeployed state to a respective deployed state when electrically energized, the respective second motor being carried on the respective frame;
a respective locking mechanism including:
a respective first projection;
a respective second projection opposite the respective first projection, the respective first projection and the respective second projection each being electrically conductive;
a respective locked state to extend the respective first projection and the respective second projection, fix the respective frame in the corresponding one of the four openings, and establish a respective electric power circuit through the respective first projection and the respective second projection to electrically energize the respective first motor and the respective second motor; and
a respective unlocked state to retract the respective first projection and the respective second projection, remove the respective frame from the corresponding one of the four openings, and open the respective electric power circuit established by the respective locked state.

10. The apparatus of claim 8, in which:
the locking mechanism is carried on the frame;
the first projection includes a first pin carried by the frame; and
the second projection includes a second pin carried by the frame.

11. The apparatus of claim 10, in which the frame includes an operator-controlled lever to select between the locked state and the unlocked state.

12. The apparatus of claim 8, further comprising:
a vehicle including a vehicle compartment with four occupant seats and a roof defining four openings therethrough each being positioned over a respective one of the four occupant seats, the vehicle roof module being removably fixed in a first one of the four openings;
first means for selectively adjusting air and light penetration through a second one of the four openings;
second means for selectively adjusting air and light penetration through a third one of the four openings; and
third means for selectively adjusting air and light penetration through a fourth one of the four openings.

13. The apparatus of claim 8, further comprising a module control arrangement operatively coupled to the first motor and the second motor to selectively adjust air and light penetration through the vehicle roof module.

14. The apparatus of claim 8, further comprising:
a vehicle defining four roof openings, the vehicle roof module occupying a first one of the four roof openings;
three other vehicle roof modules;
a first one of the three other vehicle roof modules occupying a second one of the four roof openings;
a second one of the three other vehicle roof modules occupying a third one of the four roof openings; and
a third one of the three other vehicle roof modules occupying a fourth one of the four roof openings.

15. A method of operating a vehicle roof module including a frame, a displaceable window panel and a displaceable shade, comprising:
seating said vehicle roof module in a roof opening of a vehicle roof;
shifting an actuator to a locked state to secure said vehicle roof module in said roof opening and close an electric power circuit; and driving motors to displace said displaceable window panel and said displaceable shade with power delivered through said electric power circuit.

16. The method of claim 15, including opening said displaceable shade.

17. The method of claim 16, including opening said displaceable window panel.

18. The method of claim 17, including closing said displaceable window panel.

19. The method of claim 18, including closing said displaceable shade.

20. The method of claim 19, including shifting said actuator to an unlocked state to remove said vehicle roof module from said roof opening and open said electric power circuit.

* * * * *